United States Patent [19]

Elser et al.

[11] Patent Number: 5,080,186

[45] Date of Patent: Jan. 14, 1992

[54] SERVO-ASSISTED STEERING SYSTEM FOR MOTOR VECHICLES

[75] Inventors: Dieter Elser, Essingen; Heinrich Holub, Schwäbisch Gmünd; Rudolf Schurr, Aalen, all of Fed. Rep. of Germany

[73] Assignee: Zahnradfabrik Friedrichshafen, AG., Friedrichshafen, Fed. Rep. of Germany

[21] Appl. No.: 613,501

[22] PCT Filed: Jun. 10, 1989

[86] PCT No.: PCT/EP89/00652

§ 371 Date: Nov. 2, 1990

§ 102(e) Date: Nov. 2, 1990

[87] PCT Pub. No.: WO89/12567

PCT Pub. Date: Dec. 28, 1989

[30] Foreign Application Priority Data

Jun. 15, 1988 [DE] Fed. Rep. of Germany ....... 3820355

[51] Int. Cl.⁵ .............................................. B62D 5/06
[52] U.S. Cl. .................... 180/142; 180/79.1; 180/133; 74/388 PS
[58] Field of Search ............... 180/133, 141, 142, 146, 180/147, 148, 149, 79.1; 74/388 PS

[56] References Cited

U.S. PATENT DOCUMENTS 3,939,938 2/1976 Inoue ..................................... 180/142

4,368,794 1/1983 Elser et al. ........................... 180/133
4,686,433 8/1987 Shimuzu ........................ 180/79.1 X
4,800,975 1/1989 Oshita et al. .................... 180/79.1 X
4,886,138 12/1989 Graber et al. ................... 180/148 X

FOREIGN PATENT DOCUMENTS 2410489 10/1974 Fed. Rep. of Germany .
3714833 11/1987 Fed. Rep. of Germany .
2154188 9/1985 United Kingdom ............ 74/388 PS
2185223 7/1987 United Kingdom .

*Primary Examiner*—Kenneth R. Rice
*Assistant Examiner*—Kevin Hurley
*Attorney, Agent, or Firm*—Albert M. Zalkind

[57] ABSTRACT

A servo assisted power steering system for motor vehicles comprising a steering-wheel shaft (2) which is connected via a rotary slide valve (6, 7, 8) and a worm-gear spindle (4) of a steering gear (5). The rotary slide valve controls the pressure impacting on a working piston (15) in a hydraulic power boost device. A power takeoff shaft (20) of an electric motor (21) is connected with the rotary slide (7) of rotary slide valve. In case of a rotary motion of steering-wheel shaft (2), a sensor (22) so activates electric motor (21) that a small counterforce is generated upon rotary slide (7) and that force works against the rotary motion of steering-wheel shaft (2). After completion of the rotary motion of steering-wheel shaft (2), as the steering wheel is let go, rotary slide (7) is moved back all the way into its neutral position by the electric motor.

10 Claims, 3 Drawing Sheets

SERVO-ASSISTED STEERING SYSTEM FOR MOTOR VECHICLES

BACKGROUND OF THE INVENTION

The conventional steering system is disclosed in DE 3714833A.

A steering wheel shaft is connected via a rotary slide valve with an input member such as a steering worm gear or a bevel gear of a servo assisted steering gear. A working piston of a hydraulic servomotor or boost device is arranged within the steering gear housing. In case of a relative rotation of the steering wheel shaft with respect to the input member, the rotary slide valve operates to apply pressure generated by a hydraulic servopump to assist the steering effort. At a power takeoff shaft an electric motor is connected with the input member of the steering gear. The electric motor is controlled by a signal from a sensor which is generated in response to rotation of the steering wheel. In the conventional servo assisted power steering system, a signal from a sensor such as a torque sensor, provides the electric motor power assist in case of hydraulic power boost failure such as low oil pressure. A torque rod arranged between the steering wheel shaft and the input memeber, supplies a relatively minor but vehicle operator noticeable reaction torque to the steering wheel. By means of the torque rod, the rotary slide valve is also turned toward its neutral position. Precise mid-point centering of the rotary slide valve and influencing the manual force or torque required by the operator by the presence of parameters such as vehicle load or speed in not possible in the conventional power assisted steering system.

THE PRESENT INVENTION

The purpose of the invention is to improve on a servo assisted steering system so that the exact rotary slide valve midpoint centering is made possible. Further, the reaction torque to be noticed by the vehicle operator when turning the steering wheel, is influenced in a simple manner by various parameters, such as, the vehicle speed, the cargo weight or both.

According to the invention, an electric motor is connected to the rotary slide of a rotary valve and thus with the steering wheel shaft. A sensor responsive to the turning of the steering wheel generates a signal to cause the motor to provide a slight opposing torque to the manual turning of the steering wheel. After termination of the rotary motion of the steering wheel, as the steering wheel is released, the rotary valve is moved back into its neutral position by the electric motor. The signal for operating the electric motor can be controlled by sensor signals which are a function of the vehicle speed, the vehicle load or both. By means of a second sensor arranged on an output member of the steering gear the electric motor is so controlled that it will move the rotary slide beyond its neutral position into a control position which corresponds to a steering direction reversal. The rotary slide is thus kept in this steering position until such time as the output member (worm gear) returns to its neutral position by responding to the hydraulic power boost means. This results in power assisted steering return to neutral position of the steering shaft.

A further object of the invention, in case of failure of the hydraulic power assist, such as low oil pressure is made possible by the addition of a pressure sensor in the oil pressure line leading from the servopump to the rotary slide valve. Upon detection of low oil pressure, the electric motor is operated to turn the steering wheel shaft in the same direction as the direction of the steering wheel so as to provide an electrical assist function. The location of the sensor is optional. If arranged on the side of the electric motor instead of near the steering wheel, the installation conditions will be identical to the conventional system.

DESCRIPTION OF THE PREFERRED EMBODIMENT

Figure 1:
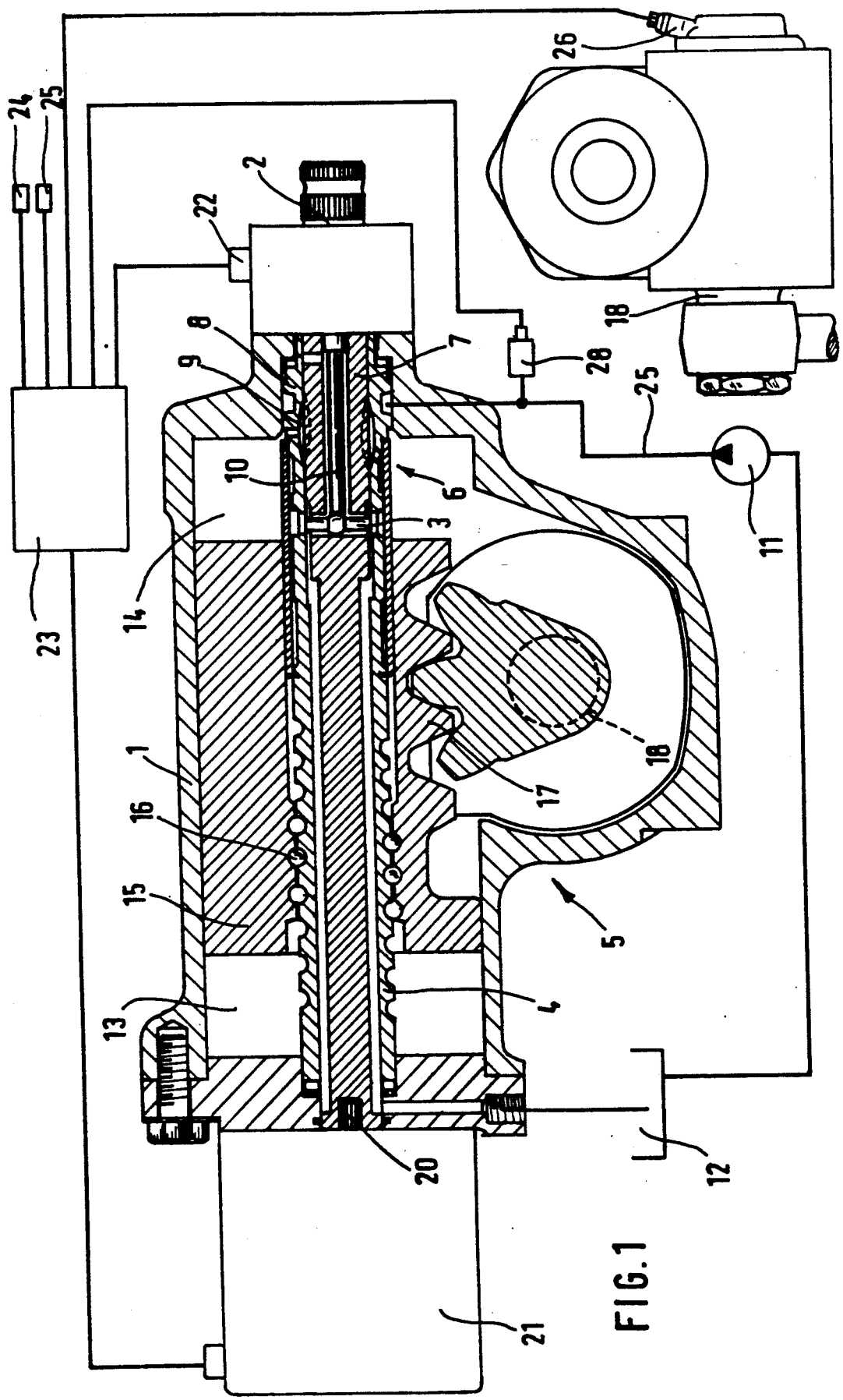
FIG. 1 shows a longitudinal section of the main components of the invention with the electric motor connected to the power takeoff shaft.

FIG. 1 shows a servomotor assisted steering gear including housing 1, steering wheel shaft 2 to the operated by a steering wheel (not shown). Shaft 2 is operatively connected by means of cross bolt 3 and axial rod 10 to worm gear spindle 4 operating as input means of steering gear 5. A rotary slide valve 6, comprising rotary slide 7, valve sleeve 8 and control grooves 9 operate to control oil flow in a conventional manner. Rotary slide 7 is fixedly connected to the steering wheel shaft 2 and valve sleeve 8 is electrically coupled with worm gear shaft 4. Steering wheel shaft 2 and rotary slide 7 are supported in the axial direction without play by an axial rod 10 fastened to steering wheel shaft 2 and cross bolt 3. The rotary deflection of slide 7 with respect to valve sleeve 8 is limited by the cross bolt 3. Instead of rotary slide valve 6, a rotary piston valve may be employed.

Rotary slide valve 6 permits oil under pressure generated by servopump 11 from oil tank 12 into one of two working chambers 13 or 14. The two cylindrical working chambers 13, 14 are arranged within steering gear housing 1 and are separated by working piston 15. Working piston 15 is connected via a ball chain 16 with worm gear spindle 4 and a gear-tooth system 17 to steering shaft 18, representing the output means of the steering gear 5. Working chambers 13 and 14 can also be arranged as a separate servomotor. The steering gear can be a gear wheel-pinion arrangement. A sensor 22 is arranged on steering wheel shaft 2 and responds to relative rotation of the steering-wheel with respect to the worm gear spindle 4. Sensor 22 can be a rotation angle or torque sensor. The angle of rotation between the steering-wheel shaft 2 and worm gear spindle 4 is a direct measure of the working pressure required by the hydraulic power boost (servomotor) system. A signal is transmitted to the electronic control means 23 proportional to the angle or torque determined by sensor 22. Electric motor 21 is controlled by means 23 so that a counterforce is generated on rotary slide 7 and thus on steering-wheel shaft 2 which works against the rotary motion of the steering wheel. This counterforce can be felt on the manual steering wheel as the operator turns the wheel. This counterforce can be influenced by additional signals inputted to control means 23. For example, signals from a speed sensor 24, a loading sensor 25 or both can be fed to the electronic control means 23.

After termination of a steering motion, as the steering wheel is let go, the electric motor 21 is further controlled by the electronic control means 23 so that it moves the rotary slide 7 back in a direction toward its neutral position, specifically, until such time as sensor 22 indicates the neutral position (zero output) and motor control is terminated. By this method of operation it is possible to achieve very good mid-point centering of rotary slide valve 6.

FIG. 1 shows a second sensor 26 arranged to sense rotation of steering shaft 18. Such arrangement makes it possible to achieve combined hydraulic axle centering in the following manner. If, for example, steering wheel shaft 2 is turned by two rotations of the steering wheel, then the corresponding rotary motion is registered by the second sensor 26 on steering shaft 18. If, following termination of the rotary motion, the steering wheel is let go, then rotary slide 7 is moved back in the direction toward its neutral position in the manner described above. The second sensor 26, sensing the rotation of steering shaft 18, outputs a signal corresponding to the exact deflection angle to the electronic control means 23. As a result control means 23 receives the additional output from sensor 26, the electric motor 21 moves the rotary slide 7 beyond its neutral position into a steering position that corresponds to a steering direction reversal. As a result, working chamber 13, whose pressure was relieved earlier, is now supplied with oil pressure and the steering shaft is returned to its straight ahead neutral position, because of the hydraulic assist. Electronic control means 23 is so designed that rotary slide 7 is turned beyond its neutral position only in case when there is actually a turning angle present on steering shaft sensor 26. By means of the particular design of control means 23, it is possible to generate a predetermined level of the reaction forces that depends upon the steering shaft 18 rotation. Because of this kind of activation of electric motor 21, it is possible, for example, even in case of minor deviations from the straight-ahead neutral position, to generate a high reaction force pattern while the return movement from larger steering angles is controlled according to a lesser reaction force pattern.

The operating safety of the power steering system is increased by the addition of a pressure sensor 28 in the oil pressure line 27 that runs from servopump 11 to rotary slide valve 6. In case of failure of the hydraulic power boost device such as in case of a pressure drop below a predetermined value required for the proper operation of the power boost device, pressure sensor 28 supplies a signal to control means 23. This signal causes the control means 23 to operate the electric motor 21 to turn in a manner supporting the steering force. This method of operation is effected by the simultaneous presences of signals from pressure sensor 28 and sensor 22.

Figure 2:
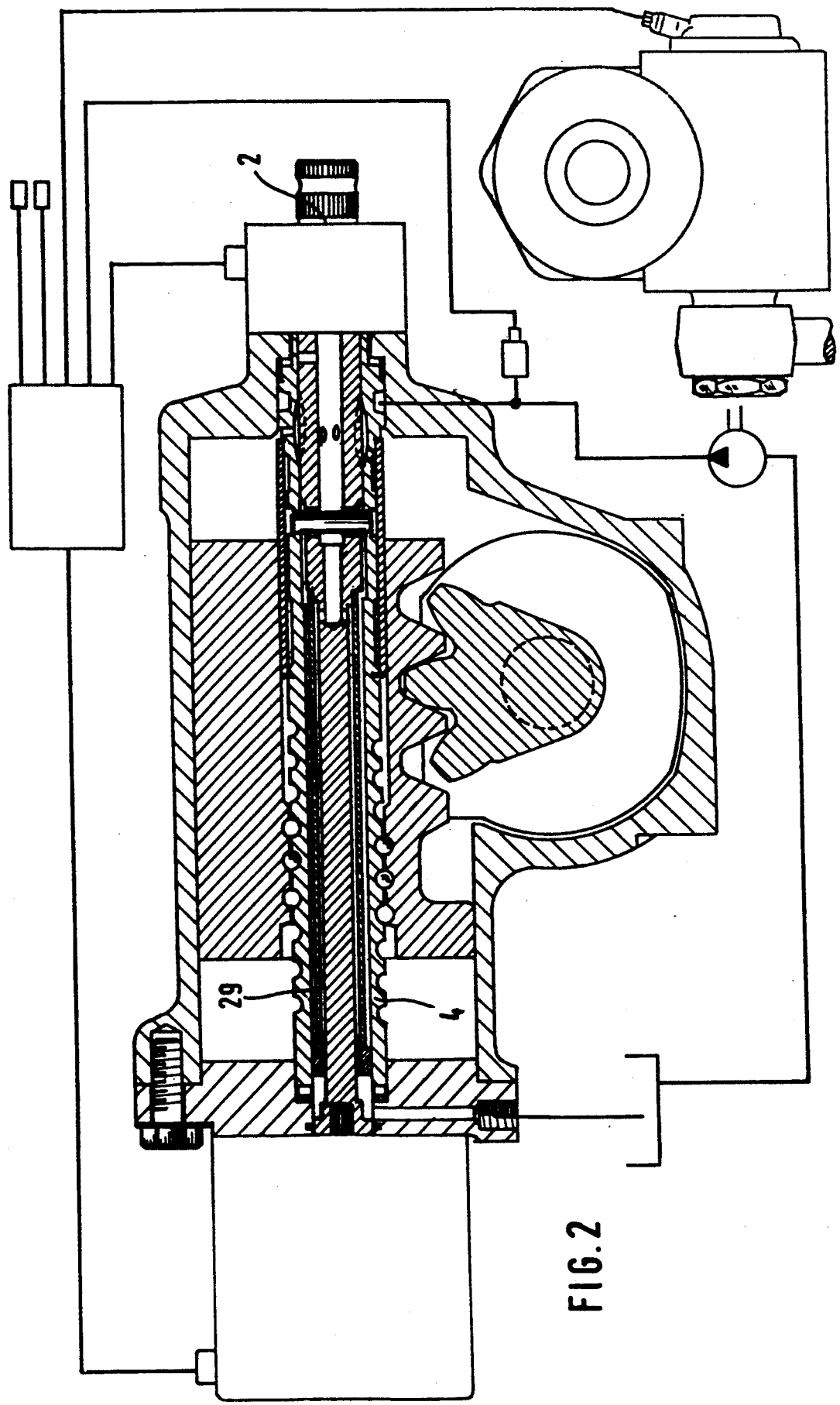
FIG. 2 shows a second arrangement but including a torsion spring or torque rod.

FIG. 2 illustrates a second embodiment of the servo assisted steering system that essentially corresponds to the example shown in FIG. 1. Additionally, however, a torsion spring, in the form of a torsion pipe 29, is arranged between steering wheel shaft 2 and worm gear spindle 4. Turning of the steering wheel must thus overcome the torsional force of the torsion pipe 29. In case of a deflection of rotary slide valve 6 out of its neutral position this force is felt as additional although relatively minor manual force on the steering wheel. As the steering wheel is let go, following termination of a steering movement, rotary slide 7 is moved back in the direction toward its neutral position by torsion pipe 29.

The inclusion of the additional torsion pipe 29 offers the advantage that, in case of failure of electric motor 21 to operate, the mid-point centering of rotary slide valve 6 will still be possible. Further, a low level residual counterforce is always present as steering wheel shaft 2 is turned. For the hydraulic steering shaft return function, only one signal is required, the signal from the second sensor 26 on steering shaft 18. Since the torsion constant of torsion sleeve 29 is known, the electric motor 21 is therefore controlled so that it will produce a very specific rotary movement and that will turn rotary slide 7 into a precisely defined position for the steering shaft return.

Figure 3:
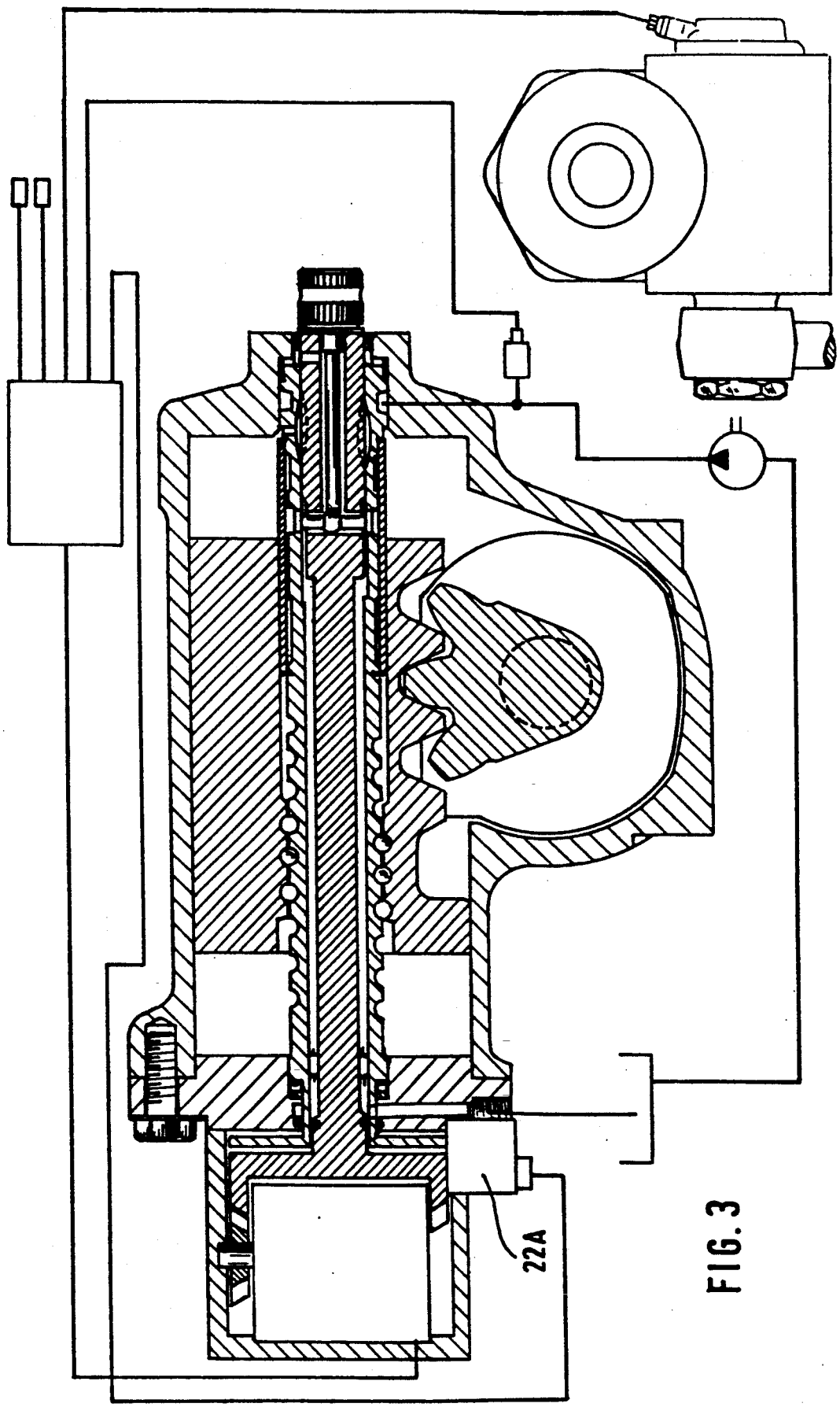
FIG. 3 shows a further arrangement with the motor connected via bevel gear.

The embodiment according to FIG. 3 corresponds almost completely to the system shown in FIG. 1. The first sensor 22 however is located away from the position on steering wheel shaft 2. The Figure shows the sensor 22 located next to the electric motor 21 on the lower part of steering gear 5. With the sensor 22 arranged in this fashion, it is impossible to construct the power assisted steering system connected to steering wheel shaft 2 according to the same installation dimensions as a conventional power steering system. In this way, for example, the distance between the steering wheel shaft connection and steering shaft 18 can remain the same.

As a further modification, a bevel gearing is used as shown in FIG. 3, for the drive connection to the torque rod.

The present invention has been described with respect to particular embodiments. However other embodiments within the scope of the invention would be apparent to practitioners in the art. Therefore, the description and drawings are to be deemed as merely illustrative of the invention which is defined by the appended claims and their legal equivalents.

We claim:

1. A servo assisted steering system for motor vehicles, comprising a steering gear housing (1) a steering wheel shaft (2) connected through a torque rod (2A) to a steering wheel a flow control rotary slide valve (6, 7, 8) connected to input member worm gear shaft (4) of a steering gear (5) including a servo motor piston (15) operatively connected to a servo pump (11), so that rotation of a steering wheel with respect to that input member effects flow of oil under pressure from said servo pump via said rotary valve to at least one chamber (13, 14), a power take up shaft (20) at the end of said torque rod, an electric motor (21) in operational connection with the rotary slide (7) of said rotary slide valve and said steering gear, further including a motor control means (23) including a sensor (22) responsive to steering wheel rotation, said control means operates said electric motor (21) to generate a torque opposite to that of steering wheel torque on said torque rod (2A) to counter rotate said rotary slide (7) and upon release of the steering wheel effects a move of said servo motor piston towards neutral position.

2. The servo assisted steering system as set forth in claim 1, said steering gear (5) including a steering shaft (18) and a second sensor (26) associated therewith and responsive to movement of said steering shaft out of the neutral position caused by steering wheel rotation, said control means (23) upon receiving a signal from said second sensor (26) in response to release of the steering wheel, controls the electric motor to effect rotation of said rotary slide (7) beyond the neutral position corresponding to a reversal of steering direction and holding said rotary slide at said reversed position until said steering shaft (18) has returned to its neutral position.

3. The servo assisted steering system as set forth in claim 2, wherein an oil pressure line (27) from the servo pump to said rotary valve (6, 7, 8) includes a pressure sensor (28) for providing a pressure signal to said control means (23) so that the electric motor is actuated to oppose the torque of steering wheel rotation for normal oil pressure but in the event of a pressure drop in said line (27) below a predetermined value required during steering operation, said electric motor torque is reversed to provide steering power to said steering gear.

4. The servo assisted steering system as set forth in claim 1, wherein said electric motor (21) is disposed radially of said steering gear (5) and opposite the steering wheel shaft connection (2).

5. The servo assisted steering system as set forth in claim 3, wherein the sensor (22) is arranged on the side of the steering wheel shaft connection (2).

6. The servo assisted steering system as set forth in claim 3, wherein the sensor (22) is arranged on the side of the electric motor (21).

7. The servo assisted steering system according to claim 1 wherein said torque rod (2A) is a torsion spring.

8. The servo assisted steering system according to claim 7 wherein the torsion spring has the shape of a torsion pipe.

9. The servo assisted steering system as set forth in claim 1, where the torque of the electric motor is additionally controlled as a function of at least one of vehicle speed and load weight of the vehicle.

10. The servo assisted steering system as set forth in claim 1, further including a pressure sensor (28) arranged in the pressure line (27) that leads from servo pump (11) to the rotary slide valve and the electric motor is activated, by a signal generated by the pressure sensor, in the direction of a steering force supporting function, in case of a pressure drop in the pressure line below a predetermined value required for the operation of the servo motor piston.

* * * * *